(12) United States Patent
Nakazawa

(10) Patent No.: US 7,792,760 B2
(45) Date of Patent: Sep. 7, 2010

(54) PRINTING DEVICE, INFORMATION PROCESSING APPARATUS, PRINTING SYSTEM, SIGNATURE VERIFYING METHOD, SIGNATURE ADDING METHOD, AND PROGRAM

(75) Inventor: Toshiyuki Nakazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 811 days.

(21) Appl. No.: 11/271,475

(22) Filed: Nov. 10, 2005

(65) Prior Publication Data

US 2006/0106720 A1    May 18, 2006

(30) Foreign Application Priority Data

Nov. 12, 2004   (JP)   ............... 2004-329787

(51) Int. Cl.
*G06Q 20/00*   (2006.01)

(52) U.S. Cl. ................. 705/75; 380/55; 380/259; 380/278; 380/29; 380/30; 726/1; 726/2; 726/26; 713/150; 713/156; 713/176; 713/177; 705/50; 705/342

(58) Field of Classification Search ................. 380/51; 705/50–59, 75
See application file for complete search history.

(56) References Cited

U.S. PATENT DOCUMENTS

| | | | | |
|---|---|---|---|---|
| 6,011,849 | A * | 1/2000 | Orrin ........................... | 380/42 |
| 6,307,955 | B1 * | 10/2001 | Zank et al. ................... | 382/121 |
| 6,314,521 | B1 * | 11/2001 | Debry .......................... | 726/10 |
| 6,385,728 | B1 * | 5/2002 | DeBry ........................... | 726/9 |
| 6,772,133 | B1 | 8/2004 | Kambayashi et al. | |
| 6,789,194 | B1 * | 9/2004 | Lapstun et al. .............. | 713/176 |
| 6,862,583 | B1 * | 3/2005 | Mazzagatte et al. .......... | 705/64 |
| 7,152,158 | B2 | 12/2006 | Watanabe et al. | |
| 2002/0042884 | A1 * | 4/2002 | Wu et al. ..................... | 713/201 |
| 2002/0080959 | A1 | 6/2002 | Weller | |
| 2003/0009672 | A1 * | 1/2003 | Goodman .................... | 713/176 |
| 2003/0037250 | A1 * | 2/2003 | Walker et al. ............... | 713/200 |
| 2003/0063744 | A1 * | 4/2003 | Parry ........................... | 380/51 |
| 2003/0101337 | A1 * | 5/2003 | Wu .............................. | 713/100 |

(Continued)

FOREIGN PATENT DOCUMENTS

JP          08-216481          8/1996

(Continued)

OTHER PUBLICATIONS

Schneier, B. Applied Cryptography. 1996.John Wiley & Sons, Inc. 2nd Edition. pp. 4, 17, 28-29, and 37-38.*

(Continued)

*Primary Examiner*—Evens J Augustin
*Assistant Examiner*—Calvin K Cheung
(74) *Attorney, Agent, or Firm*—Canon U.S.A., Inc., IP Division

(57) ABSTRACT

A printing device capable of preventing a printing process from being performed in accordance with print information sent from a printer driver in version for which permission of use is not given. In a host computer, a print data generator adds signature data to print data, which is transferred to a printer, by employing a signature algorithm and signature-related data. In a printer, a print data analyzing/processing unit extracts the signature data having been added to the print data transferred from the host computer, and verifies the extracted signature by employing a signature verification algorithm and signature verification data.

7 Claims, 12 Drawing Sheets

U.S. PATENT DOCUMENTS

| | | | |
|---|---|---|---|
| 2003/0105963 A1* | 6/2003 | Slick et al. | 713/171 |
| 2003/0182475 A1* | 9/2003 | Gimenez | 710/8 |
| 2004/0008842 A1* | 1/2004 | Partelow et al. | 380/51 |
| 2004/0107348 A1* | 6/2004 | Iwamura | 713/176 |
| 2004/0125402 A1* | 7/2004 | Kanai et al. | 358/1.15 |
| 2005/0039018 A1* | 2/2005 | Wittkotter | 713/176 |

FOREIGN PATENT DOCUMENTS

| | | |
|---|---|---|
| JP | H09-048165 A | 2/1997 |
| JP | 2000260121 A | 9/2000 |
| JP | 2002207427 A | 7/2002 |
| JP | 2002-316465 A | 10/2002 |
| JP | 2003-5639 | 1/2003 |

OTHER PUBLICATIONS

Purdum, J., C Programmer's Toolkit, 1992, Que Corporation, 2nd Edition, pp. 340-341.*

* cited by examiner

PRINTING DEVICE, INFORMATION PROCESSING APPARATUS, PRINTING SYSTEM, SIGNATURE VERIFYING METHOD, SIGNATURE ADDING METHOD, AND PROGRAM

BACKGROUND OF THE INVENTION

1. Field of the Invention

The present invention relates to a printing device, an information processing apparatus, a printing system, a signature verifying method, a signature adding method, and a program.

2. Description of the Related Art

Hitherto, in a network constructed of a plurality of host computers and printers, printer drivers of different versions have often been installed in the host computers. Also, when printers operate with the same printer language, but their types differ from each other, printer drivers adapted for the different types of printers have often been installed in the host computers. In such a situation, when print information produced by the printer drivers of different versions or by the printer drivers operating with the same printer language, but differing in type from each other is sent to the same printer, particularly when print information produced by a printer driver for a particular printer type is used in another type of printer for printing the produced print information, there may occur problems such as a printing failure, false rewriting of printer environment setting information, and rewriting of a font cache.

Japanese Patent Laid-Open No. 8-216481 discloses a technique to overcome those problems in a printer in which print information transferred from a printer driver in an external device is analyzed and a printing process is executed based on the analysis result. According to Japanese Patent Laid-Open No. 8-216481, the printer stores first management information for managing a printer main unit. On the other hand, second management information for identifying and managing a printer driver is embedded in print information produced by the printer driver. Then, the printer compares the second management information transferred from the printer driver in the external device with the first management information. If the second management information does not match with the first management information, the printer exercises control on a demand issued to the external device for the print information.

However, the known printer disclosed in Japanese Patent Laid-Open No. 8-216481 has problems as follows.

So long as the printer driver having produced the print information is one adapted for the relevant printer, that printer always starts operation to execute the printing process in accordance with the transferred print information. Therefore, even when the print information is received from a printer driver for which permission of use is not given by a system manager, for example, the printer starts operation to execute the printing process in accordance with the print information transmitted from that printer driver. The "printer driver for which permission of use is not given by a system manager" means, e.g., a printer driver that may cause a trouble in printing. If the printer driver for which permission of use is not given by the system manager is used, printing failure or other troubles may occur, thus necessitating an inquiry to the system manager or causing wasteful consumption of printer resources including sheets of paper.

Also, the following problem arises in a print network system wherein the system manager permits use of a particular printer driver for the purposes of security, billing, management of the number of printed sheets of paper, etc. For example, if a user obtains a printer driver for which permission of use is not given by the system manager and installs it in a host computer, printing can be performed with the installed printer driver without being subjected to the intended supervision, i.e., security, billing, management of the number of printed sheets of paper, etc.

SUMMARY OF THE INVENTION

In view of the problems mentioned above, the present invention provides an improved printing device, printing system, signature verifying method, and program.

Also, the present invention prevents a printing process from being executed in accordance with print data sent from a printer driver for which permission of use is not given.

Further, the present invention prevents printing failure or other troubles, to thereby eliminate the necessity of making an inquiry to the system manager or to avoid wasteful consumption of printer resources including sheets of paper.

Still further, the present invention positively ensures that printing is always performed under supervision of the system manager.

According to one aspect, the present invention provides a printing device comprising a signature extracting unit adapted to extract signature data added to print data transferred from an information processing apparatus connected with the printing device via a network; a registering unit adapted to register predetermined information, for verifying whether the signature data is genuine or not, received via the network; a signature verifying unit adapted to verify whether the signature data is genuine or not, which has been extracted by the signature extracting unit, by using the predetermined information registered by the registering unit; and a print process unit adapted to execute print process in a case where the signature verifying unit verifies that the signature data is genuine, not to execute print process in a case where the signature verifying unit verifies that the signature data is not genuine.

According to another aspect, the present invention provides a printing system comprising an information processing apparatus and a printing device connected via a network, the printing system comprising a signature unit adapted to add signature data to print data, which is transferred from the information processing apparatus to the printing device; a signature extracting unit adapted to extract the signature data added to the print data transferred from the information processing apparatus to the printing device; a registering unit adapted to register predetermined information for verifying whether the signature data is genuine or not to the printing device; a signature verifying unit adapted to verify whether the signature data, which has been extracted by the signature extracting unit, by using the second predetermined information registered by the registering unit; and a print process unit adapted to execute print process in a case where the signature verifying unit verifies that the signature data is genuine, not to execute print process in a case where the signature verifying unit verifies that the signature data is not genuine.

According to still another aspect, the present invention provides a signature verifying method used in a printing device connected to an information processing apparatus via a network, the method comprising the steps of extracting step of extracting signature data added to print data transferred from the information processing apparatus; registering step of registering predetermined information, for verifying whether the signature data is genuine or not, received via the network; verifying step of verifying the signature data, which has been extracted in the extracting step, by using the predetermined information registered in the registering step; and print process executing step of executing print process using the print data in a case where the verifying step verifies that the signature data is genuine.

According to still another aspect, the present invention provides a signature verifying method used in a printing system comprising an information processing apparatus and a printing device connected via a network, the method comprising the steps of adding step of adding signature data to print data, which is transferred from the information processing apparatus to the printing device, extracting step of extracting the signature data added to the print data; registering step of registering predetermined information for verifying whether the signature data is genuine or not to the printing device; verifying step of verifying the signature data, which has been extracted in the extracting step, by using the predetermined information registered in the registering step; and print process executing step of executing print process using the print data in a case where the verifying step verifies that the signature data is genuine.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Figure 1:
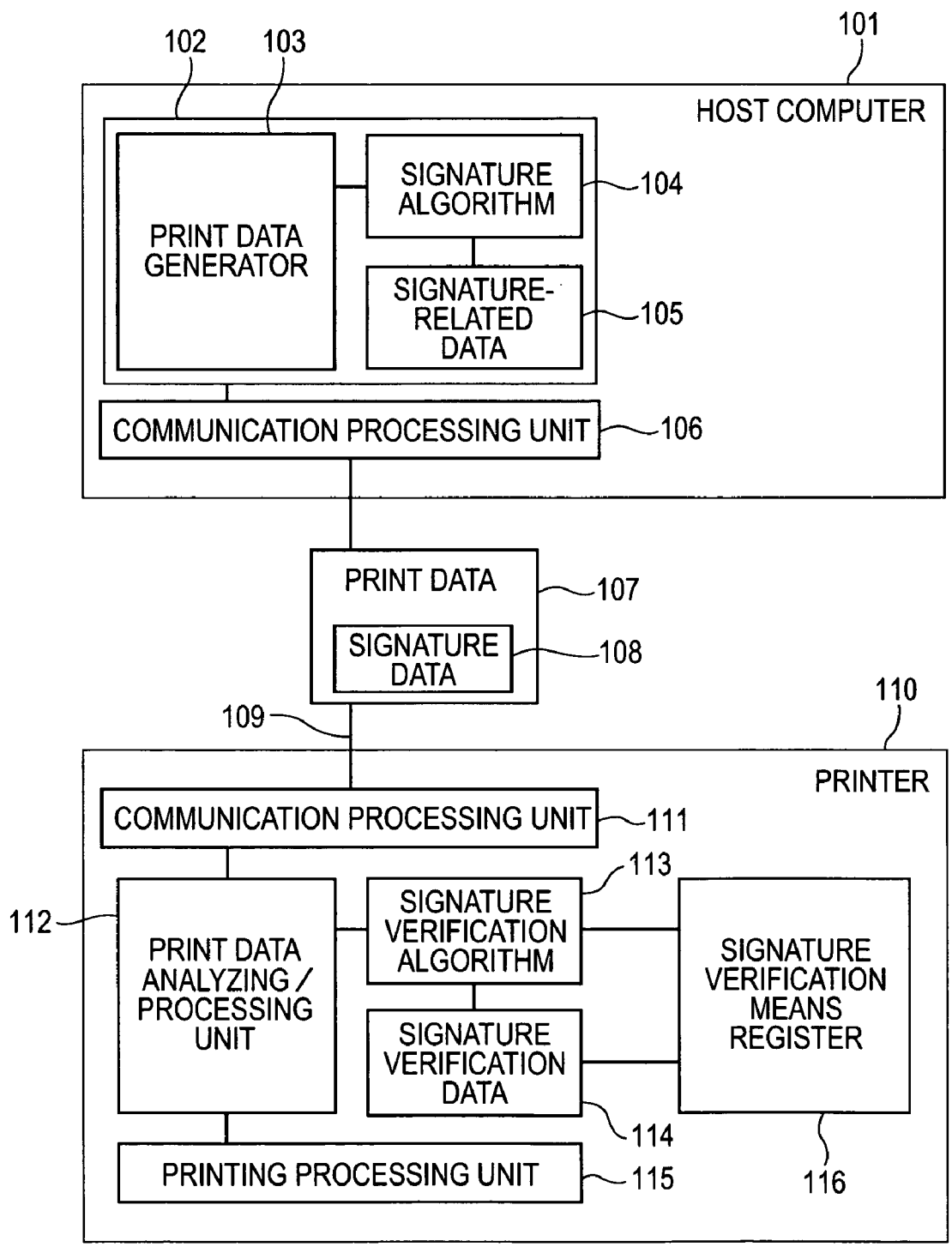
FIG. 1 is a block diagram showing a software configuration of a printing system according to a first embodiment of the present invention.

The present invention will now be described in detail with reference to the drawings showing embodiments thereof. In the drawings, elements and parts which are identical throughout the views are designated by identical reference numerals, and duplicate description thereof is omitted.

First Embodiment

FIG. 1 is a block diagram showing a software configuration of a printing system according to a first embodiment of the present invention.

Referring to FIG. 1, a host computer 101 and a printer 110 are interconnected via a network.

The host computer 101 includes a printer driver 102. The printer driver 102 converts document information including figures, images, characters, etc., which are prepared by, e.g., a document editing program operating on the host computer 101, into the page description language or the like interpretable by the printer 110. The printer driver 102 is one approved by a system manager and is distributed to each user of the host computer 101 from the system manager.

The printer driver 102 includes a print data generator 103 for producing print data. Also, the printer driver 102 includes a signature algorithm 104 that is called by the print data generator 103 and produces a signature added to the print data. Further, the printer driver 102 includes signature-related data 105 that is data representing a signature added to the print data by the signature algorithm 104. Note that the contents of the signature-related data 105 are recognizable by only the system manager. The print data generator 103 adds a signature to the print data by employing the signature algorithm 104 and the signature-related data 105, thus producing print data 107 added with signature data 108. The produced print data 107 added with the signature data 108 is transmitted to the printer 110 via a communication path 109 by a communication processing unit 106.

The printer 110 includes a communication processing unit 111 for receiving the print data 107 added with the signature data 108 from the host computer 101 via the communication path 109. The received print data 107 added with the signature data 108 is analyzed in a print data analyzing/processing unit 112, and the signature data 108 is extracted. A signature verification algorithm 113 executes signature verification on the extracted signature data 108 by employing signature verification data 114. As with the signature-related data 105, the contents of the signature verification data 114 are recognizable by only the system manager. If a result of the signature verification made by the signature verification algorithm 113 determines that the signature is genuine, the print data 107 added with the signature data 108 is processed in the print data analyzing/processing unit 112 through, e.g., a step of deleting the signature data 108, as required. Then, the print data alone is transferred to a printing processing unit 115 and is printed there. This case results in a determination that the signature-added print data 107 transmitted from the host computer 101 has been produced by the printer driver for which permission of use is given by the system manager.

A signature verification means register 116 executes a process of registering the signature verification algorithm 113 and/or the signature verification data 114 in the printer 110, and/or of deleting them from the printer 110.

A process of registering the signature algorithm 104 and/or the signature-related data 105 in the printer driver 102 is executed using another dedicated program in accordance with an instruction from the system manager, and such a program does not always have to reside on the host computer 101.

Figure 2:
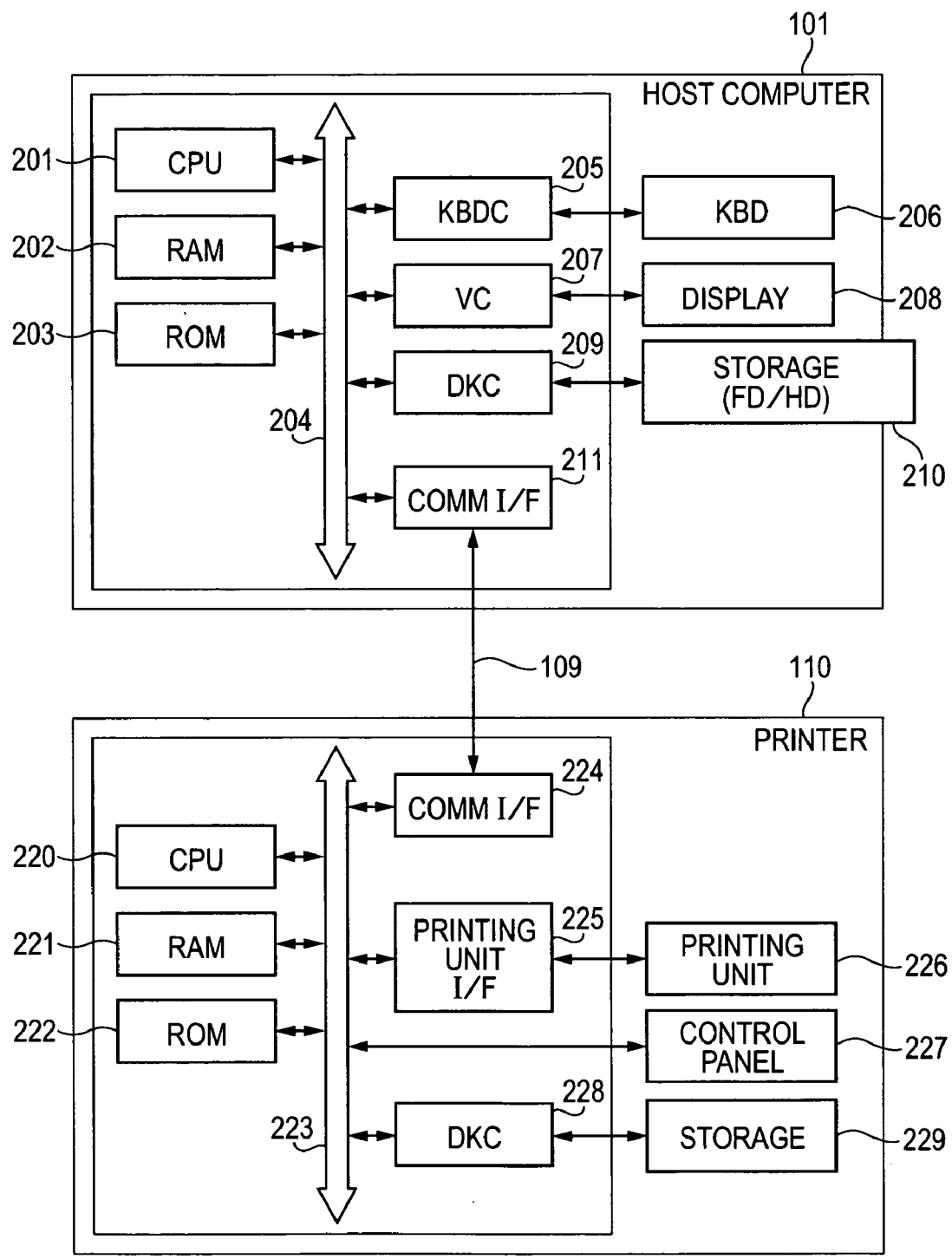
FIG. 2 is a block diagram showing a hardware configuration of the printing system according to the first embodiment of the present invention.

FIG. 2 is a block diagram showing a hardware configuration of the printing system according to the first embodiment.

The host computer 101 comprises a CPU 201, a RAM 202, a ROM 203, and an external storage 210. The ROM 203 or the external storage 210 stores software such as an operating system, a document processing program, a print data preparing program. The CPU 201 executes the software stored in the ROM 203 or the external storage 210 and controls various devices connected to a system bus 204 in a supervising manner. The RAM 202 functions as a main memory or a work area for the CPU 201. The external storage 210 can be any type of storage, such as a hard disk (HD) or a Floppy (registered trademark) disk (FD). The external storage 210 stores a boot program, an operating system, various applications, font data, user files, edit files, the print data preparing program, and so on.

Further, in the host computer 101, a keyboard controller (KBDC) 205 sends input information from a keyboard (KBD) 206 or a pointing device (not shown) to the CPU 201. A video controller (VC) 207 controls display presented on a display 208, such as a CRT or LDC. A disk controller (DKC) 209 controls access to the external storage 210.

A communication controller (COMM I/F) 211 is connected to the printer 110 via a predetermined communication path 109 that is constituted by utilizing a local area network (LAN), IEEE1284, or USB.

The printer 110 includes a CPU 220. The CPU 220 outputs an image signal, as output information, to a printing unit (printer engine) 226 via a printing unit I/F 225, which is connected to a system bus 223, in accordance with a control program stored in a ROM 222 or a storage 229. The storage 229 is constructed of, e.g., a hard disk (HD), and functions as a work area or a temporary storage for the CPU 220.

A RAM 221 functions as a main memory or a work area for the CPU 220. A control panel (operating unit) 227 comprises an input section including buttons or a touch panel, and a display section made of a liquid crystal panel, LED's or the like. The control panel 227 allows a user to perform an input operation, such as setting of an operating mode, and also displays the operating status of the printer 110. A disk controller (DKC) 228 controls access to the external storage 229.

A communication controller (COMM I/F) 224 is connected to the host computer 101 via the communication path 109.

Figure 3:
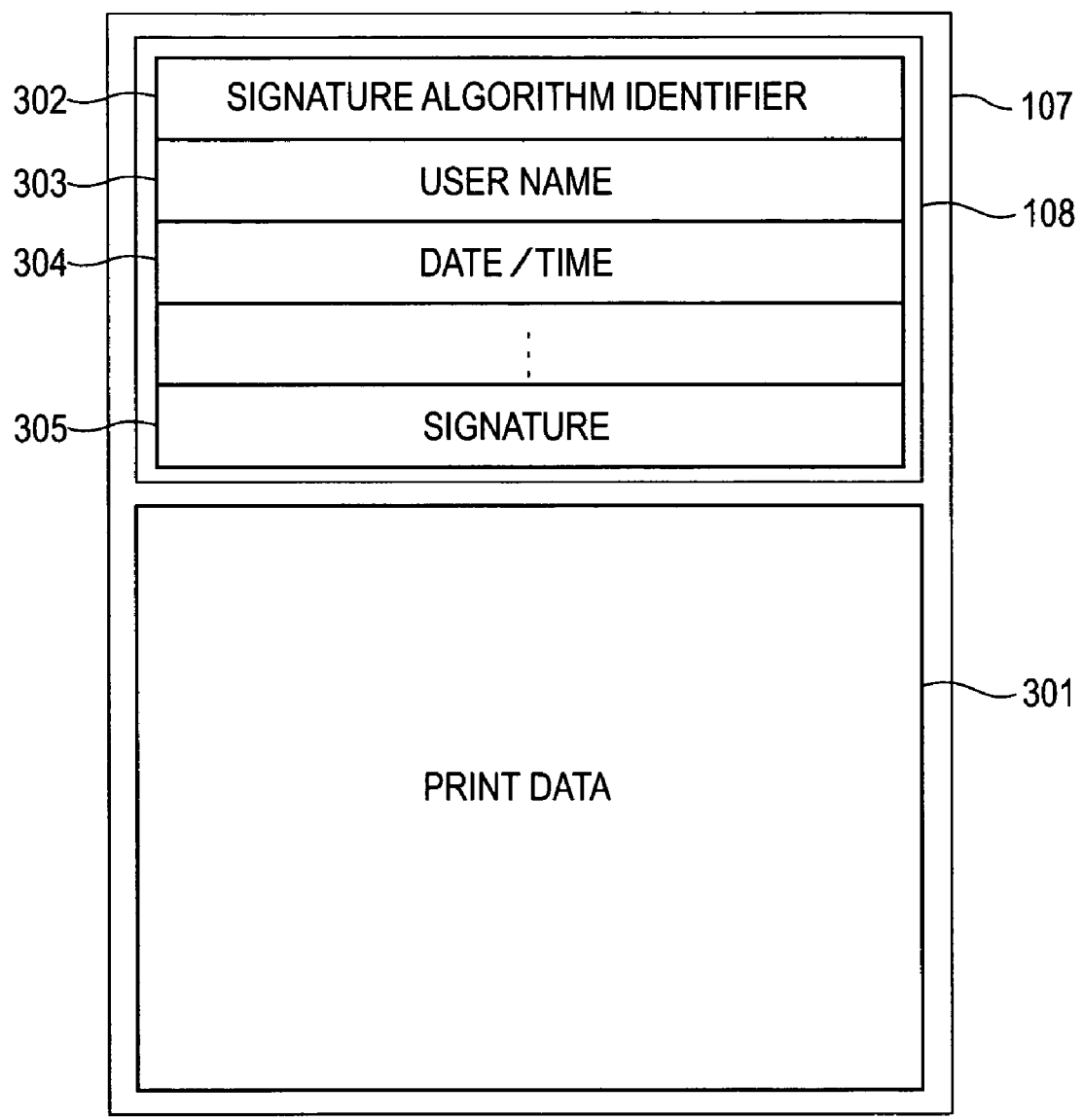
FIG. 3 is a table showing a configuration of signature-added print data shown in FIG. 1.

FIG. 3 is a table showing a configuration of the signature-added print data 107 shown in FIG. 1.

The signature-added print data 107 comprises a section of the signature data 108 and a section of print data 301. The signature data 108 is made up of an identifier 302 for identifying the signature algorithm that has been used at the time of affixing a signature 305 to the print data, a user name 303 using the host computer 101, a date/time 304 when the signature was affixed, the signature 305 itself, etc.

Figure 4:
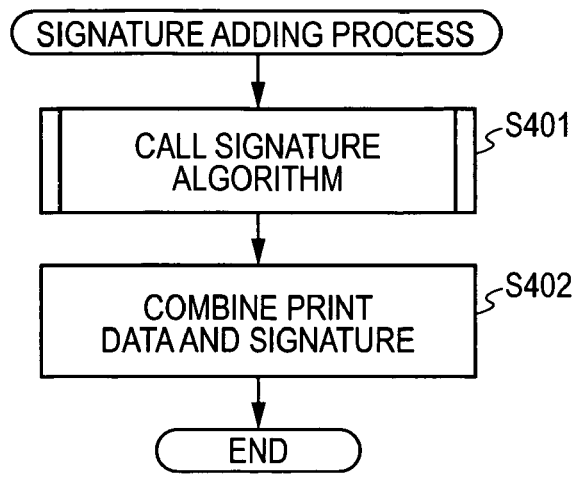
FIG. 4 is a flowchart showing primary steps of a signature adding process executed in a print data generator of a host computer.

FIG. 4 is a flowchart showing primary steps of a signature adding process executed in the print data generator 103 of the host computer 101. This signature adding process is started upon input of the print data not yet added with a signature.

In the signature adding process, first, the print data generator 103 calls the signature algorithm 104 in step S401. The called signature algorithm 104 produces the signature data 108 by employing the signature-related data 105, and sends the produced signature data 108 to the print data generator 103.

In next step S402, the print data generator 103 combines the sent signature data 108 and the input print data to produce the signature-added print data 107, whereby this signature adding process is completed.

Figure 5:
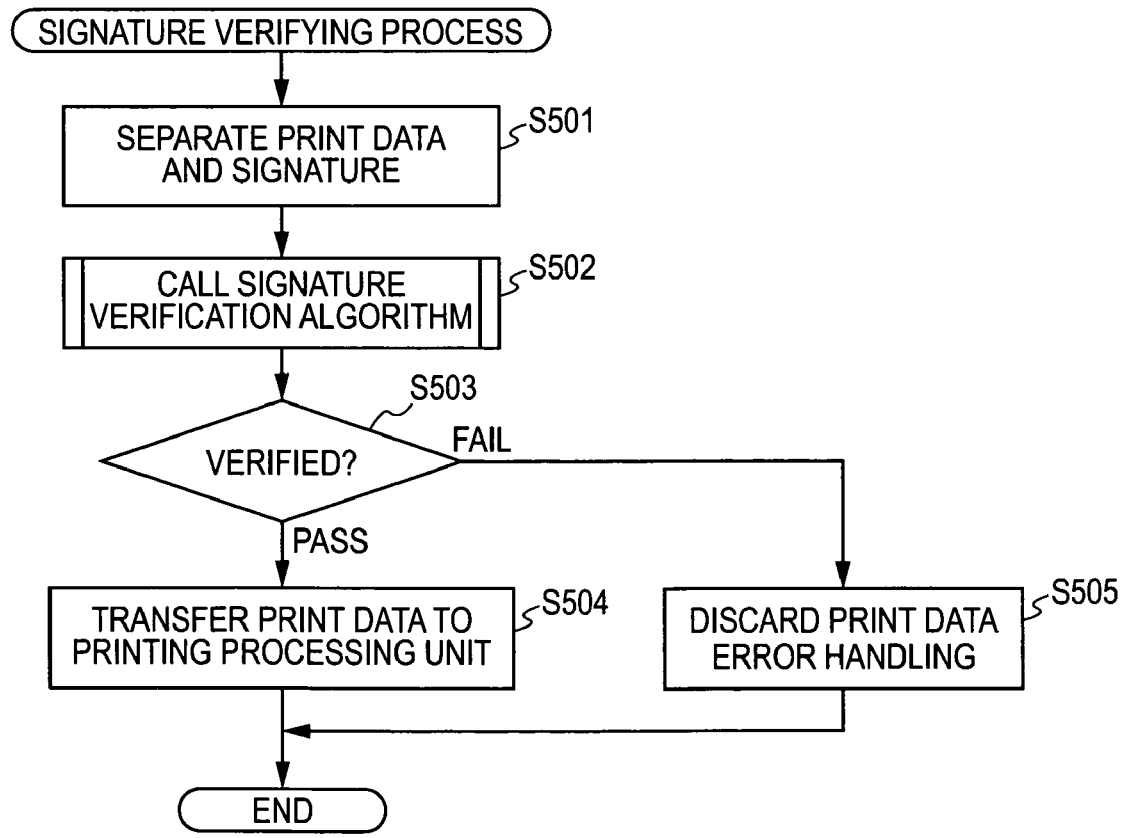
FIG. 5 is a flowchart showing primary steps of a signature verifying process executed in a print data analyzing/processing unit of a printer.

FIG. 5 is a flowchart showing primary steps of a signature verifying process executed in the print data analyzing/processing unit 112 of the printer 110.

In step S501, the print data analyzing/processing unit 112 separates the input signature-added print data 107 into the print data 301 and the signature data 108. Then, in step S502, the print data analyzing/processing unit 112 calls the signature verification algorithm 113. The called signature verification algorithm 113 verifies the signature by employing the separated signature data 108 (described later in more detail) and sends a verification result to the print data analyzing/processing unit 112.

In step S503, the print data analyzing/processing unit 112 decides which step is to be next executed, in accordance with the verification result sent to it. More specifically, if the verification is passed (if the signature is verified as being genuine), the control process advances to step S504. If the verification is failed (if the signature is not verified as being genuine), the control process advances to step S505.

In step S504, the print data analyzing/processing unit 112 transfers the print data 301, which has been separated in step S501, to the printing processing unit 115 so that the print data 301 is printed. On the other hand, in step S505, the print data analyzing/processing unit 112 executes error handling by discarding the print data 301 which has been separated in step S501. The error handling includes, for example, recording on a log and an error notification to the registered manager via E-mail.

Processes of adding and verifying the signature by employing the signature algorithm 104, the signature-related data 105, the signature verification algorithm 113, and the signature verification data 114 will be described in more detail below in connection with three methods.

A first method executes authentication to confirm identity (match) by using a data string common to the signature-related data 105 and the signature verification data 114.

According to the first method, the system manager loads an identical common data string, which has been generated by, e.g., a random number generator in advance, as each of the signature-related data 105 and the signature verification data 114. Then, the signature algorithm 104 in the host computer 101 reads the common data string from the signature-related data 105 and adds the read data string to the print data, thereby producing the print data 107 added with the signature data 108. On the other hand, the signature verification algorithm 113 in the printer 110 extracts the signature 305 from the print data 107 added with the signature data 108 and compares the signature 305 with the signature verification data 114, thereby executing the signature verification. As a result of comparing the signature 305 with the signature verification data 114, if both are identical to each other, the signature verification algorithm 113 verifies that the signature 305 is genuine.

A second method executes digest authentication using a common key for both the signature-related data 105 and the signature verification data 114.

According to the second method, a message authentication system known as SHA-1HMAC or MD5 MHAC is used as the signature algorithm 104. "SHA-1HMAC" means a message authentication checksum using a SHA-1 digest, and "MD5 MHAC" means a message authentication checksum using a MD5 digest. The system manager loads the common key, which has been generated by, e.g., the random number generator in advance, as each of the signature-related data 105 and the signature verification data 114. Then, the signature algorithm 104 in the host computer 101 adds, to the print data, the signature 305 given by a value resulting from combining the value of MHAC and the common key in the signature-related data 105 with each other, thereby producing the print data 107 added with the signature data 108. The "value of HMAC" means a message digest obtained with SHA-1 or MD5 of the print data. On the other hand, the signature verification algorithm 113 in the printer 110 extracts the signature 305 and the print data 301 from the print data 107 added with the signature data 108. Then, the signature verification algorithm 113 computes HMAC and the combination of the computed HMAC and the common key from both the print data 301 and the signature verification data 114. Upon a match of the computation result with the signature 305, it is authenticated that the signature 305 is genuine.

By employing the second method, tampering made on the section of the print data 301 can also be detected at the same time.

A third method executes authentication with a digital signature using a public key for the signature-related data 105 and the signature verification data 114.

More specifically, the third method employs a digital signature based on public key cryptography using an RSA algorithm or an ECDH algorithm as the signature algorithm 104.

The system manager loads a public key and a secret key for the public key cryptography, which have been decided in advance, as the signature-related data 105 and the signature verification data 114, respectively. Then, the signature algorithm 104 in the host computer 101 adds, to the print data, the signature 305 given by a value resulting from encrypting a message digest of the print data with SHA-1 or MD5 by using the public key for the public key cryptography loaded as the signature-related data 105. The print data 107 added with the signature data 108 is thereby produced. On the other hand, the signature verification algorithm 113 in the printer 110 extracts the print data 301 and the signature 305 from the print data 107 added with the signature data 108. Then, the signature verification algorithm 113 decrypts the signature 305 by using the secret key for the public key cryptography, which is loaded as the signature verification data 114. Upon a match of the decrypted result with the result of computing a digest of the print data 301, it is authenticated that the signature 305 is genuine.

By employing the third method, tampering with the section of the print data 301 can also be detected at the same time.

Figure 6:
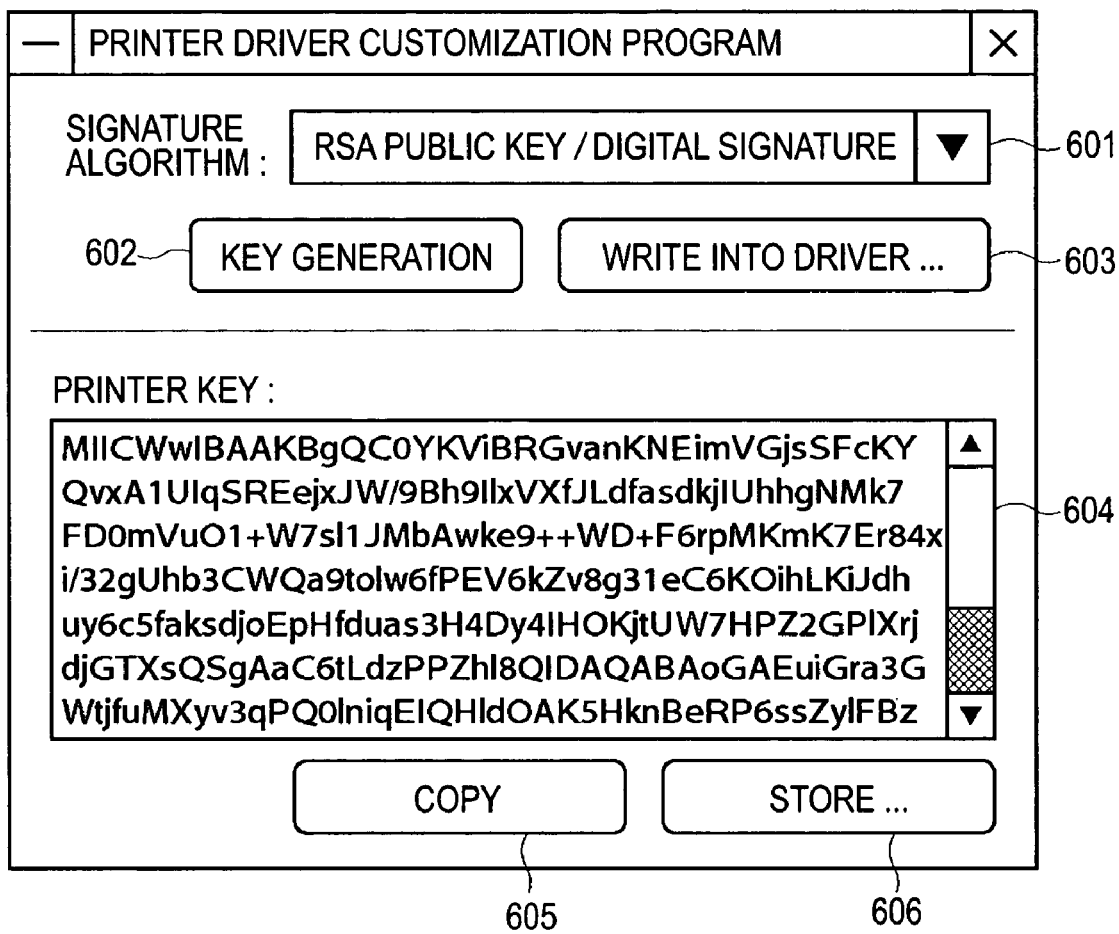
FIG. 6 illustrates an example of a screen displayed on a display of the host computer when a signature algorithm and signature-related data are registered in a printer driver of the host computer.

FIG. 6 illustrates an example of a screen displayed on the display 208 of the host computer 101 when the signature algorithm 104 and the signature-related data 105 are registered in the printer driver 102 of the host computer 101. Using the illustrated screen, the system manager registers the signature algorithm 104 and the signature-related data 105 in the printer driver 102.

Among the three methods contained in a pull-down menu 601, the user selects one signature algorithm to be used. With depression of a "key generation" button 602, the signature-related data and the signature verification data both used in the signature algorithm selected from the pull-down menu 601 are produced. The signature verification data produced by the printer driver 102 is then displayed in a printer key box 604. The signature verification data must be registered as the signature verification data 114 in the printer 110. Thus, the produced signature verification data is copied into a temporary memory inside the operating system with depression of a "copy" button 605, or it is stored as a file with depression of a "store . . . " button 606. On the other hand, the produced signature-related data is written and registered as the signature-related data 105 with depression of a "write into driver . . . " button 603. At this time, the signature-related data is written and registered together with the signature algorithm selected from the pull-down menu 601.

In FIG. 6, RSA PUBLIC KEY/DIGITAL SIGNATURE is selected by the system manager as the signature algorithm. In this case, printer driver 102 generates the public key as the signature related data 105 based on the RSA encryption, and generates the private key corresponding to the public key as the signature verification data 114. The public key and the private key have the feature that the data encrypted with one of the public key and the private key can be decrypted only with the other key. Moreover, the public key and the private key have the feature that the data cannot be decrypted with the same key as the key used by encrypting data.

Figure 7:
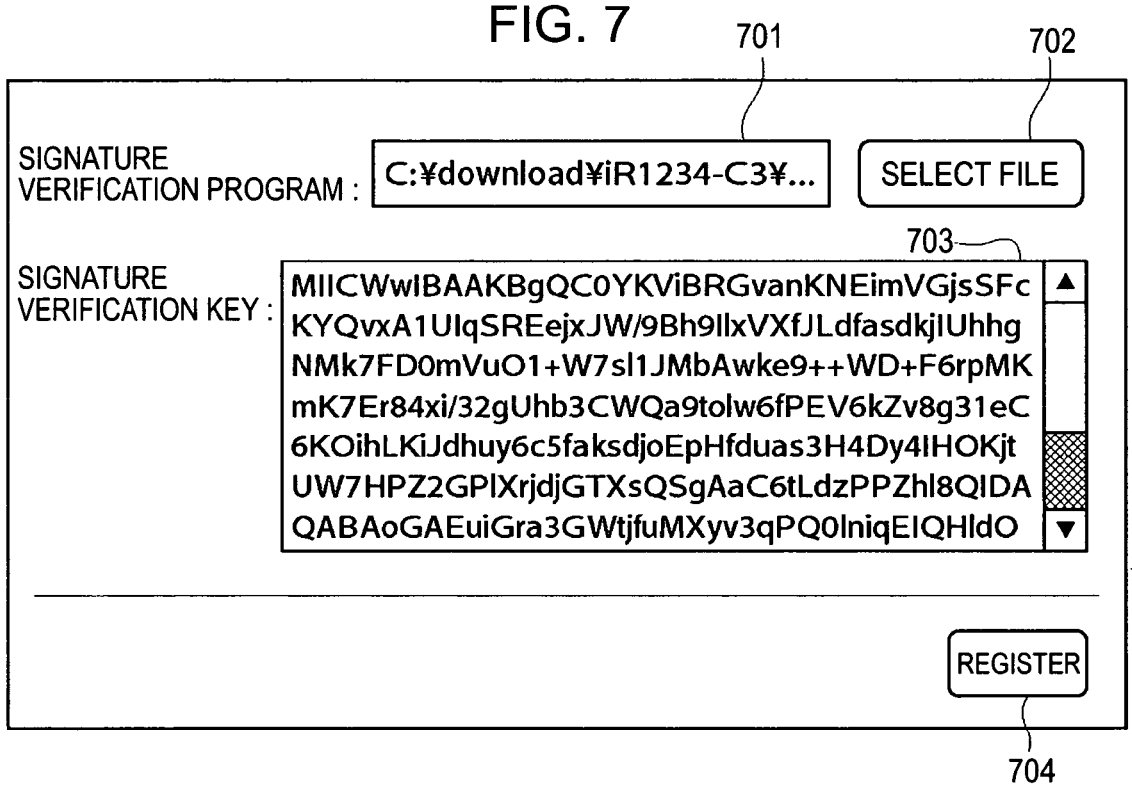
FIG. 7 illustrates an example of a screen displayed on a display of a not-shown client PC when a signature verification algorithm and signature verification data are registered in the printer.

FIG. 7 illustrates an example of a screen displayed on the display of a not-shown client PC when the signature verification algorithm 113 and the signature verification data 114 are registered in the printer 110. The register screen used in the signature verifying process is installed as a Web application with HTTP service (not shown) included in the printer 110 and is operated from a Web browser operating on the client PC.

Numeral 701 denotes an entry field for the name of the signature verification program. The user enters, in this field 701, the file path of the signature verification algorithm (previously stored in the file system of the client PC) which is to be registered as the signature verification algorithm 113 in the printer 110. When the user clicks a "select file" button 702, a file selection dialog provided from the Web browser in the client PC is opened. Then, the user browses the file system of the client PC, causing signature verification algorithm files in the file system to be displayed. From among the displayed signature verification algorithm files, the user can select one to be registered. The file path of the file selected with the file selection dialog is automatically input to the entry field 701 for the name of the signature verification program.

An entry field 703 for the signature verification data (key) receives the signature verification data corresponding to both the signature verification algorithm entered in the entry field 701 for the name of the signature verification program and the signature algorithm selected from the pull-down menu 601 in FIG. 6. Usually, when the "key generation" button 602 in FIG. 6 is depressed, a copy of the signature verification data displayed in the printer key box 604 is pasted in the entry field 703.

When the user depresses a "register" button 704, the following operation is executed. The Web browser operating on the client PC transmits two kinds of data, given below, to the Web application operating on the printer 110. One kind of data is the signature verification algorithm entered in the entry field 701 for the name of the signature verification program. The other kind of data is the signature verification data (key) entered in the entry field 703 for the signature verification data (key). The Web application stores and registers the received signature verification algorithm and signature verification data (key) respectively as the signature verification algorithm 113 and the signature verification data 114.

While this embodiment is described as registering the signature algorithm, the signature-related data, the signature verification algorithm, and the signature verification data by using the screens shown in FIGS. 6 and 7, another method can also be used for registering them. For example, a single algorithm can be previously installed in each of the printer driver 102 and the printer 110, the installed algorithms being correlated with each other. Then, only the signature-related data 105 and the signature verification data 114 are registered later. An alternative method is to previously install correlated algorithms in the printer driver 102 and the printer 110 in plural number for each of them. When using that method, algorithms to be employed are selected using similar screens to those shown in FIGS. 6 and 7 and are registered as the signature algorithm 104 and the signature verification algorithm 113. Then, the signature-related data and the signature verification data prepared corresponding to the selected algorithms are registered respectively as the signature-related data 105 and the signature verification data 114.

Second Embodiment

A second embodiment of the present invention will be described below.

In the following description of the second embodiment, the same components as those in the first embodiment are denoted by the same reference symbols. The descriptions in the first embodiment regarding the same components are similarly applied to this second embodiment, while only different components are described below.

The second embodiment relate to the case where a plurality of printers include signature verification algorithms differing from one another. Further, the second embodiment assumes that print data produced by one printer driver is printed by a plurality of printers which are approved by the system manager. In the second embodiment, a plurality of signatures are produced and added to the same print data on the printer driver side by using a plurality of signature algorithms. The second embodiment also relates to the case where different signatures are added to the same print data for each of a plurality of printer drivers by using a plurality of signature algorithms and signature-related data differing from one another. In this case, the second embodiment assumes that a printer is able to normally execute the signature verification on the print data added with any kind of the different signatures. To that end, in the second embodiment, a plurality of signature verification algorithms and data can be registered in the printer side.

Figure 8:
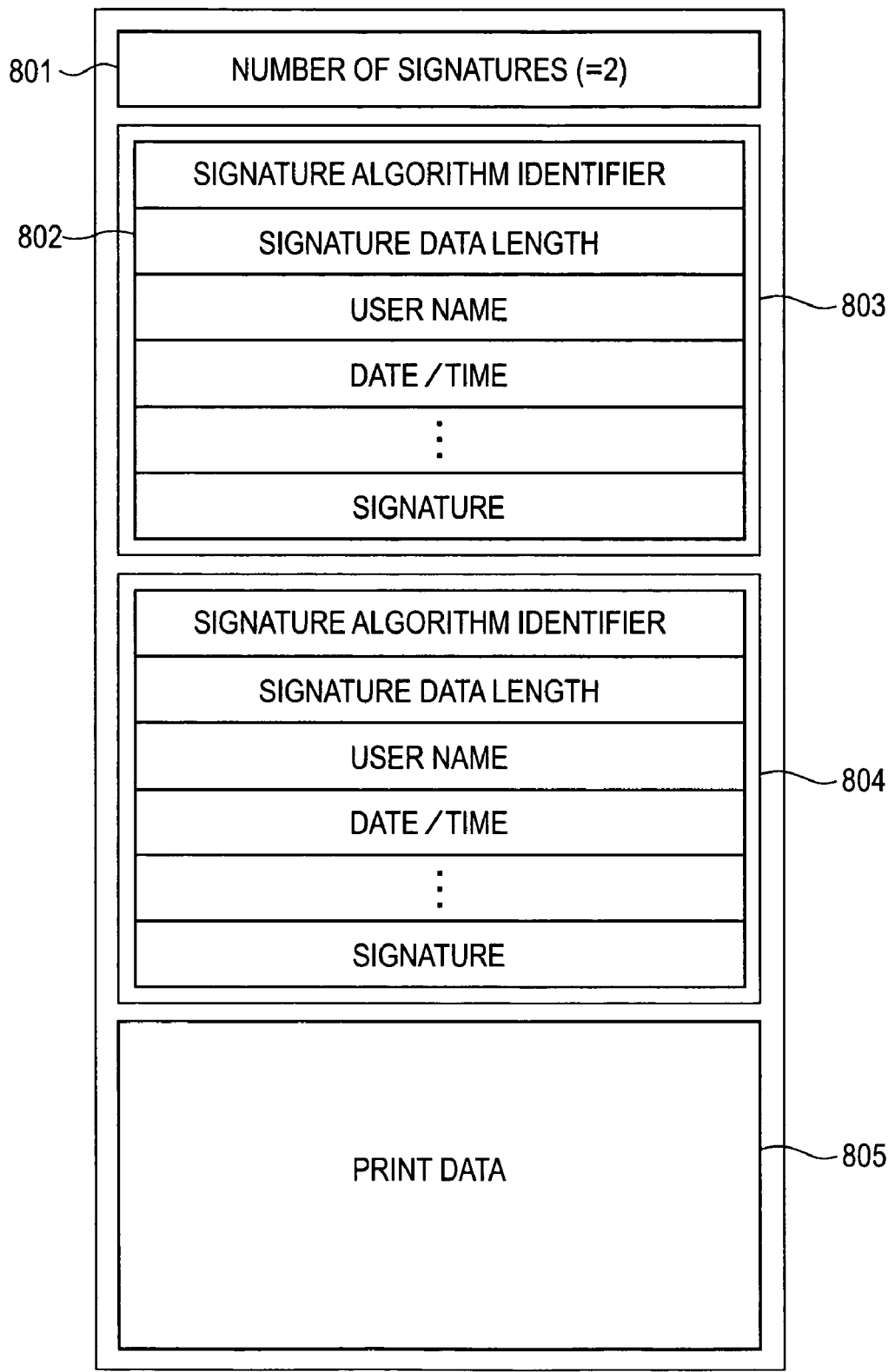
FIG. 8 is a table showing the configuration of signature-added print data produced in the printer driver side of the host computer according to a second embodiment.

FIG. 8 is a table showing a configuration of signature-added print data produced in the printer driver side of the host computer according to the second embodiment.

Referring to FIG. 8, the number 801 of signatures represents the number of signature data contained in the signature-added print data. Because two kinds of signature data are added in the example shown in FIG. 8, the number 801 of signatures is set here to 2. Subsequent to the number 801 of signatures, sets of signature data 803, 804 are continued in the same number as that indicated by the number 801 of signatures. The contents of each of the signature data 803, 804 are basically the same as those of the signature data 108 in the first embodiment, shown in FIG. 3, except that a signature data length field 802 is added in the second embodiment. The signature data length indicated in the signature data length field 802 enables a program to specify the start position of the next signature data 804 and the start position of the print data 805.

Figure 9:
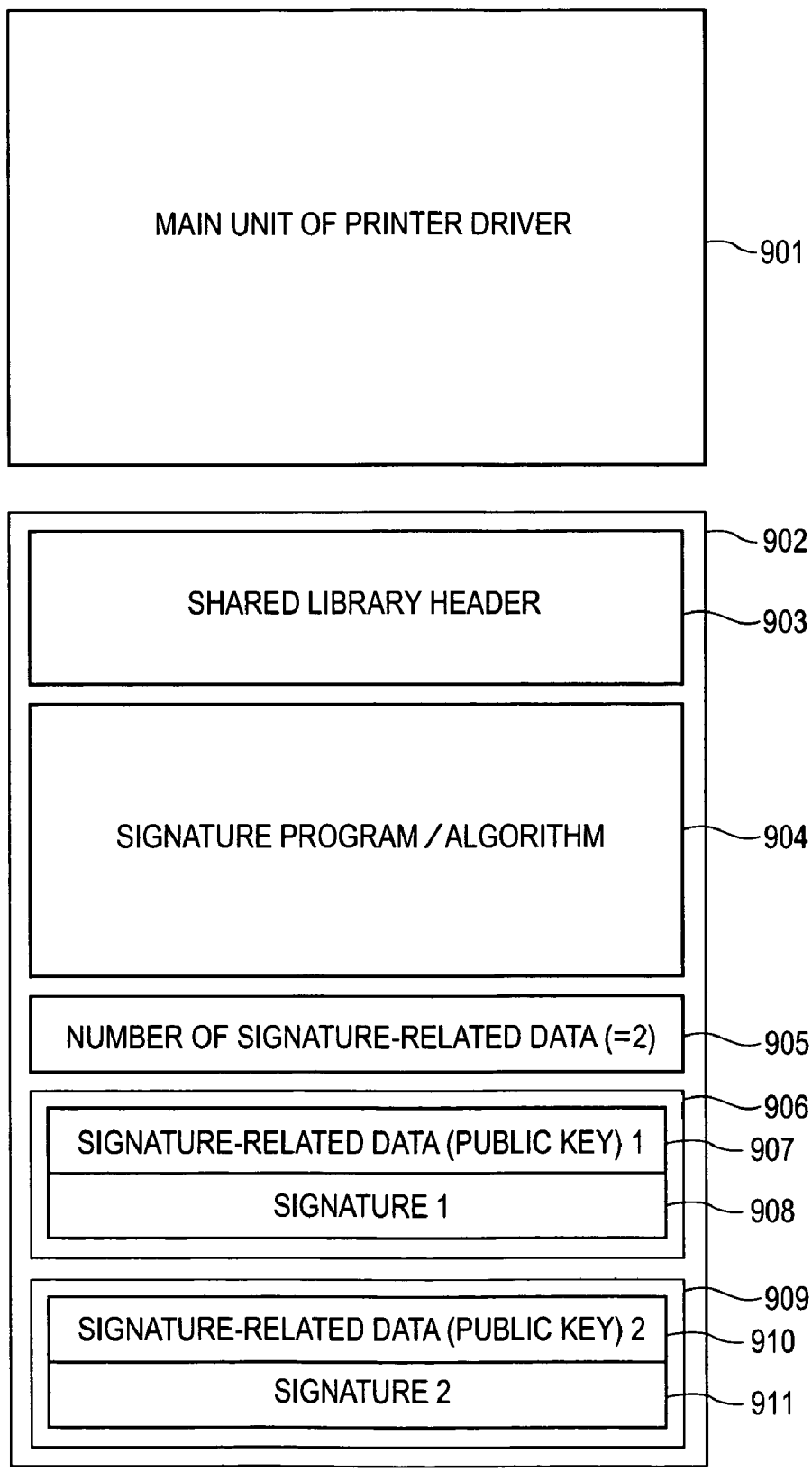
FIG. 9 is a block diagram showing a configuration example of a printer driver when a plurality of signature data are produced using a public key cryptography system, for example, and are added to print data in the host computer according to the second embodiment.

FIG. 9 is a block diagram showing a configuration example of the printer driver when a plurality of signature data are produced using a public key cryptography system, for example, and are added to print data in the host computer according to the second embodiment.

In the configuration example of the printer driver shown in FIG. 9, the signature algorithm and the signature-related data are installed as a signature shared library 902 separately from a printer driver main unit 901 for the purpose of facilitating addition and deletion of the signature-related data.

The signature shared library 902 includes a shared library header 903 for storing information regarding the signature shared library, and a signature program/algorithm 904 containing a signature algorithm. The printer driver main unit 901 produces the signature data 803, 804 for the print data 805 by calling the signature program/algorithm 904.

The number 905 of signature-related data represents the number of signature-related data contained in the signature shared library 902. In the example shown in FIG. 9, the number 905 of signature-related data is 2.

Numerals 906 and 909 denote signature-related data made up of signature public keys 907, 910 and signatures 908, 911, respectively. The signature public keys 907, 910 are used at the time of adding digital signatures to the print data 805, and a digest of the print data 805 is encrypted with those public keys.

The signatures 908, 911 are computed by encrypting, with respective secret keys corresponding to the public keys 907, 910, a combination of a digest of the printer driver main unit 901 and a digest of a program portion (903 and 904) of the signature shared library 902. The purpose of computing the signatures in such a way resides in binding the public keys 907, 910 to the printer driver main unit 901 and the signature program/algorithm 904.

The program in the printer driver main unit 901 confirms that the signature shared library 902 is effective for the printer driver main unit 901 if the following two values are matched with each other. One value is the combination of the digest of the printer driver main unit 901 and the digest of the program portion (903 and 904) of the signature shared library 902. The other value is a value obtained by decrypting the signature 908 with the public key 907 or a value obtained by decrypting the signature 911 with the public key 910.

Instead of the configuration of the printer driver shown in FIG. 9, the number 905 of signature-related data and the signature-related data 906, 909 can be separated from the signature shared library 902. In this case, the signature shared library 902 is divided into a signature shared library containing just the shared library head 903 and the signature program/algorithm 904, and a signature-related data section containing the number 905 of signature-related data and the signature-related data 906, 909. The file configuration in this case is more complicated than that shown in FIG. 9, but it facilitates registration and/or deletion of the signature-related data because the signature-related data section is separated as another file from the signature shared library. Further, since a process of separating the signature-related data from the signature shared library is no longer required, facilitation is realized, for example, in computing a digest of the signature shared library section in a process of verifying the printer driver main unit 901 and the signature shared library, and in a process of adding the signature to the print data 805.

The configuration of the printer driver shown in FIG. 9 assumes the case where a plurality of signature data are produced by using the public key cryptography system and added to the print data. Alternatively, the configuration of the printer driver can be modified so as to produce a plurality of signature data by using any other suitable signature-data producing system and to add them to the print data.

A printer in the second embodiment will be described below.

Figure 10:
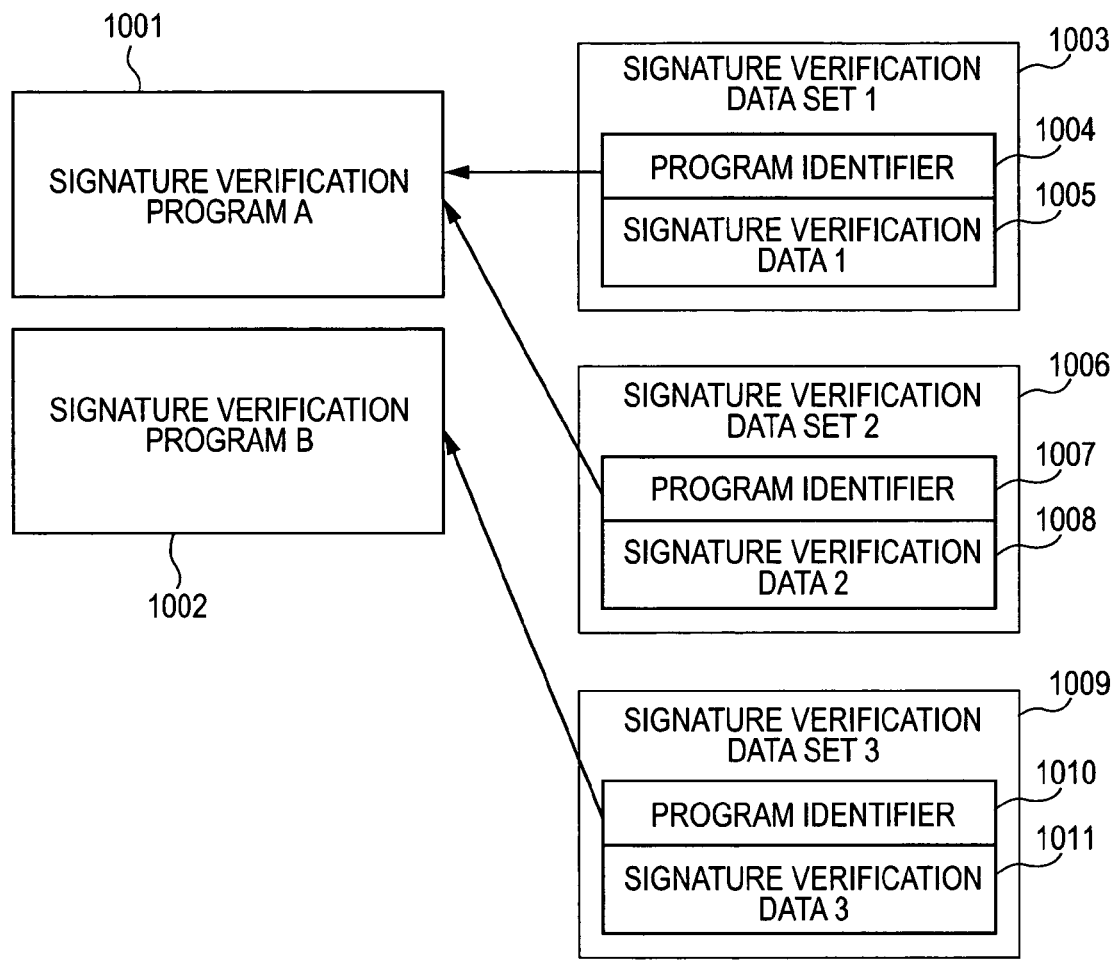
FIG. 10 is a block diagram showing a configuration for holding a plurality of signature verification algorithms and a plurality of signature verification data in a printer according to the second embodiment.

FIG. 10 is a block diagram showing a configuration for holding a plurality of signature verification algorithms and a plurality of signature verification data in the printer according to the second embodiment.

The printer in the second embodiment can register a plurality of signature verification algorithms and a plurality of signature verification data. Numerals 1001 and 1002 denote respectively signature verification programs (A) and (B) which are registered in the printer and contain signature verification algorithms differing from each other. Numerals 1003, 1006 and 1009 denote respectively signature verification data sets 1, 2 and 3. The signature verification data sets 1003, 1006 and 1009 are made up identifiers 1004, 1007 and 1010 for identifying the signature verification programs, and signature verification data (1-3) 1005, 1008 and 1011 corresponding to the signature verification programs, respectively. In an example shown in FIG. 10, the signature verification data set (1) 1003 and the signature verification data set (2) 1006 correspond to the signature verification program (A) 1001 and are used in the signature verification program (A) 1001. Also, the signature verification data set (3) 1009 corresponds to the signature verification program (B) 1002 and is used in the signature verification program (B) 1002.

Figure 11:
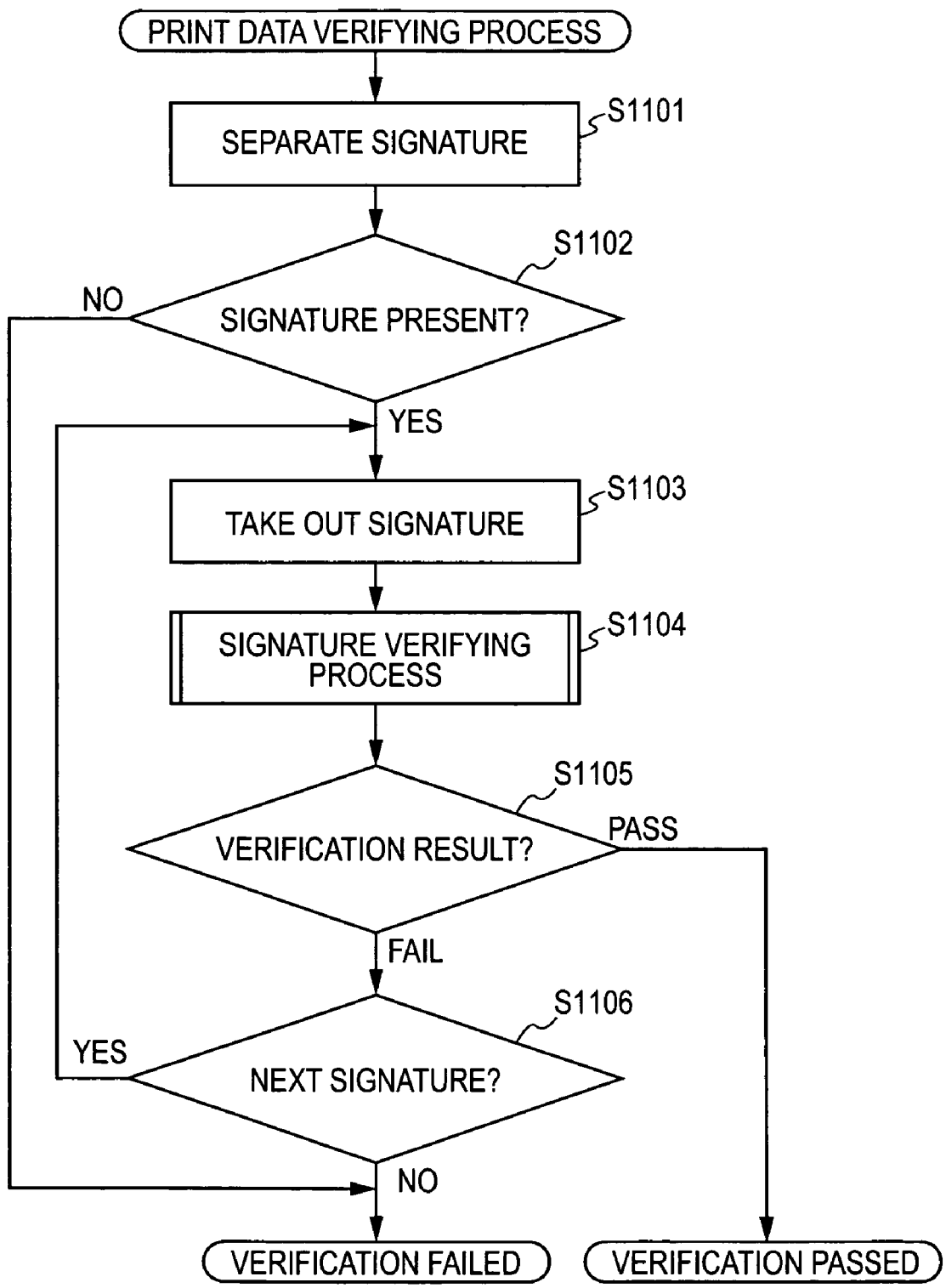
FIG. 11 is a flowchart showing steps of a print data verifying process executed in the printer when print data added with a plurality of signature data is received by the printer in which the plurality of signature verification algorithms and the plurality of signature verification data are registered.

FIG. 11 is a flowchart showing steps of a print data verifying process executed in the printer when print data added with a plurality of signature data is received by the printer in which the plurality of signature verification algorithms and the plurality of signature verification data are registered.

Upon receiving the print data added with a plurality of signature data, the printer separates the signature data and the print data from each other in step S1101.

In next step S1102, it is determined whether the signature data is present after the separation. If the signature data is present, the control process advances to step S1103. On the other hand, if no signature data is present, the verification is regarded as being failed, and this print data verifying process is brought to an end.

In step S1103, one of the plurality of signature data obtained after the separation is taken out. In step S1104, a signature verifying process (described later) is executed based on the taken-out signature data and the print data 805. The signature verifying process in step S1104 will be described in detail with reference to FIG. 12.

Step S1105 checks the result of the signature verifying process executed in step S1104. If the signature verification is passed, this print data verifying process is brought to an end with the result of the verification being passed. On the other hand, if the signature verification is failed, the control process advances to step S1106 in which it is determined whether, among the plurality of signature data separated in step S1101, there is still present any one that is not yet subjected to the processing of steps S1103-S1105. If signature data not yet processed is still present, the control process returns to step S1103. If not present, this print data verifying process is brought to an end with the result of the verification being failed.

Figure 12:
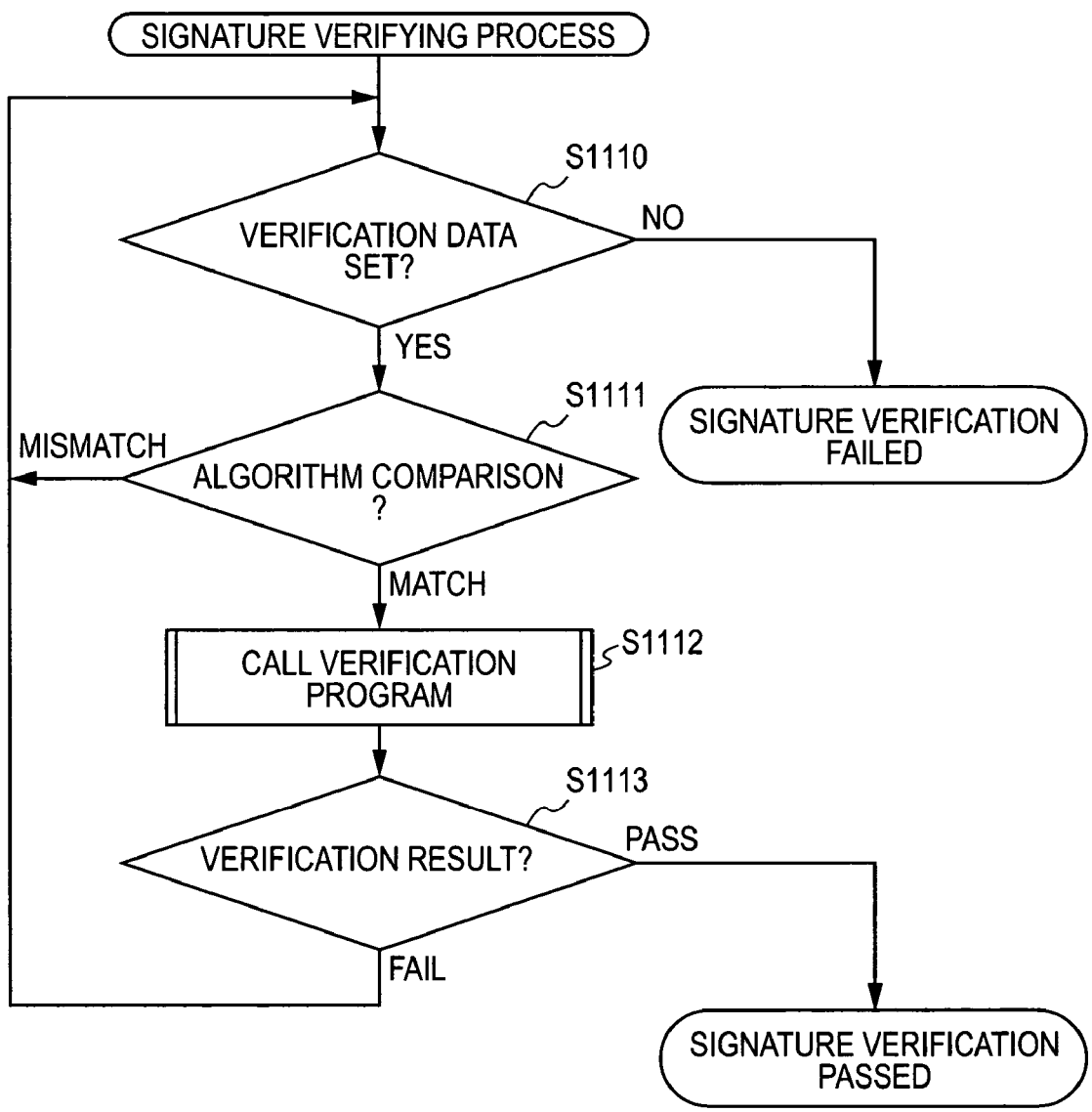
FIG. 12 is a flowchart showing detailed processing procedures of a signature verifying process in step S1104 of FIG. 11.

FIG. 12 is a flowchart showing detailed processing procedures of the signature verifying process in step S1104 of FIG. 11.

First, in step S1110, it is determined whether, among the plurality of signature verification data sets 1003, 1006 and 1009, there is present any one that is not yet subjected to algorithm comparison executed in next step S1111. If not present, this signature verifying process is brought to an end with the result of the signature verification being failed.

If the signature verification data set not yet subjected to the algorithm comparison is present, the control process advances to step S1111. Then, the program identifier (1004, 1005 or 1006) of that not-yet compared one among the plurality of the signature verification data sets is compared with the identifier of the signature algorithm in the signature data taken out in step S1103 of FIG. 11. If the two identifiers are not matched with each other, the control process returns to step S1110. On the other hand, if matched, the control process advances to step S1112. Then, the signature verification program (1001 or 1002) corresponding to the matched program identifier is called. Further, the signature verification is executed by the signature verification program while using the signature verification data (1005, 1008 or 1011) corresponding to the matched program identifier.

If the signature verification is passed in step S1113, this signature verifying process is brought to an end with the result of the signature verification being passed. If the signature verification is failed, the control process returns to step S1110 and the next signature verification data set is taken out.

Thus, according to the second embodiment, when a plurality of printers have different signature verification algorithms, a plurality of signature data corresponding to the signature verification algorithms are added to the print data on the printer driver side as shown in FIGS. 8 and 9. Therefore, each of the printers can execute the signature verification by using one of the plurality of signature data sent from the printer driver.

Also, as shown in FIGS. 10-12, one printer has a plurality of signature verification algorithms and a plurality of signature verification data. This means that, for example, when the printer driver is updated, the following two data sets can be registered in one printer. A first data set contains the signature verification algorithm and the signature verification data corresponding respectively to the signature algorithm and the signature-related data for an old version of the printer driver. A second data set contains the signature verification algorithm and the signature verification data corresponding respectively to the signature algorithm and the signature-related data for a new version of the printer driver. The printer is able to employ either the printer driver of the old version or the printer driver of the new version after identifying them.

Third Embodiment

A third embodiment of the present invention will be described below.

Figure 13:
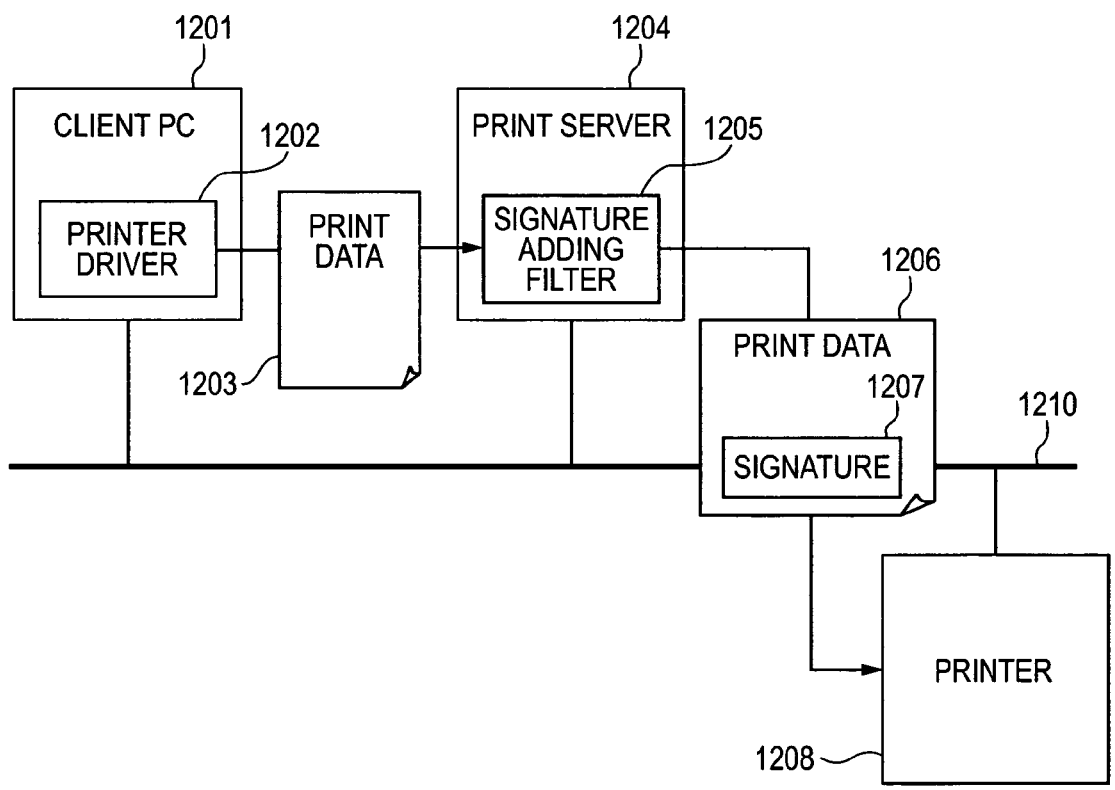
FIG. 13 is a block diagram showing a configuration of a printing system according to a third embodiment of the present invention.

FIG. 13 is a block diagram showing a configuration of a printing system according to the third embodiment.

In the third embodiment, the printing system is constituted by interconnecting a client PC 1201, a print server 1204, and a printer 1208 via a local area network (LAN) 1210.

In the third embodiment, the process of adding a signature to print data is executed by an application operating on the print server 1204, which serves to relay the print data, separately from the process of producing the print data.

More specifically, in accordance with a printing instruction from an application operating on the client PC 1201, the print driver 1202 operating on the client PC 1201 produces print data 1203 and sends the print data 1203 to the print server 1204. In the print server 1204, a signature adding filter 1205 operating on the print server 1204 adds a signature 1207 to the received print data 1203, to thereby produce a signature-added print data 1206. Then, the signature-added print data 1206 thus produced is sent to the printer 1208. The printer 1208 executes verification of the signature 1207 in signature-added print data 1206 by using the signature verification algorithm and the signature verification data both registered in the printer 1208. If the verification is passed, the print data 1203 is printed.

With the third embodiment, a restriction can be applied to the printer 1208 so that only the print data sent through the signature adding filter 1205 in the print server 1204 is printed.

In the third embodiment, the print data 1206 to which signature 1207 is added is transmitted from the print server 1204 to the printer 1208. However, these transmission methods may be the following transmission methods. First of all, client PC1201 transmits print data 1206 to print server 1204 for requesting the generation of signature 1207. Next, print server 1204 generates the signature 1207 based on the print data 1206, and transmits the signature 1207 to the client PC1201. Then the client PC1201 adds the signature 1207 to the print data 1206, and sends the signature 1207 and the print data 1206 to the printer 1208.

Other Embodiments

In the first embodiment, the public key is used as the signature data 105. However, other data can be used as the signature data 105. For example, the private key can be used as the signature data 105. In this case, the private key generated by using the RSA encryption method is used as the signature data 105 that is included in printer driver 102 of host computer 101. On the other hand, the public key generated by using the RSA encryption method is used as signature verification data 114 that is stored in the printer 110. The feature of the present invention can also be achieved by supplying a storage medium, which stores program code of software for realizing the functions of any of the above-described embodiments, to a system or an apparatus. In this case, a computer (CPU or MPU) in the system or the apparatus reads and executes the program code stored in the storage medium.

In that case, the program code read out of the storage medium serves to realize the novel feature of the present invention. Hence the storage medium storing the program code and a program represented in the form of the program code constitute examples of the present invention.

Storage media for storing and providing the program code can be, e.g., flexible disks, hard disks, optical disks, magneto-optical disks, CD-ROM, CD-R, and CD-RW. Other examples are DVD-ROM, DVD-RAM, DVD-RW, DVD+RW, magnetic tapes, nonvolatile memory cards, ROM, etc. Alternatively, the above-mentioned program is supplied by downloading it from, e.g., another computer or database, which is connected to the Internet, a commercial network, a local area network, etc.

Also, the present invention involves the case in which the functions of any of the above-described embodiments are realized by an Operating System (OS) or the like which is running on the computer and executes a part or the whole of the actual processing in accordance with commands from the program codes, in order to realize the functions of any of the above-described embodiments.

Further, the program code can be written in a memory provided in a function add-on board inserted in the computer or a function add-on unit connected to the computer. In this case, a CPU or the like incorporated in the function add-on board or unit executes a part or the whole of the actual processing in accordance with commands from the program code, in order to realize the functions of any of the above-described embodiments.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2004-329787 filed Nov. 12, 2004, which is hereby incorporated by reference herein in its entirety.

What is claimed is:

1. A printing device comprising:
at least one processor programmed to control one or more of:
  a receiving unit constructed to receive print data to which signature data is added, from an information processing apparatus connected with the printing device via a network;
  a signature extracting unit adapted to extract the signature data from the received print data;
  a storage unit constructed to store a plurality of signature verification data for verifying whether the signature data is genuine, wherein a signature verification program corresponding to one of the plurality of signature verification data is different from a signature verification program corresponding to another of the plurality of signature verification data;
  a determining unit constructed to determine whether the extracted signature data corresponds to at least one of the signature verification programs;
  a signature verifying unit constructed to verify whether the extracted signature data is genuine by using the signature verification program corresponding to the extracted signature data and the stored signature verification data corresponding to the signature verification program in a case where it is determined that the extracted signature data corresponds to at least one of the signature verification programs;
  a printing unit constructed to print sheets based on the received print data; and
  a control unit constructed to control the printing unit to execute print process in a case where the signature verifying unit verifies that the extracted signature data is genuine and to control the printing unit not to execute print process in a case where the signature verifying unit verifies that the extracted signature data is not genuine.

2. The printing device according to claim 1, wherein at least one of the plurality of signature verification data is a key for decrypting the extracted signature data, and wherein the signature verifying unit verifies whether the extracted signature data is genuine based on a decryption data generated by decrypting the extracted signature data with the key.

3. The printing device according to claim 2, wherein
the signature data is generated by encrypting the data generated by executing predetermined conversion process to the print data, and
wherein the decryption data is generated by decrypting the signature data with the key.

4. The printing device according to claim 3, wherein the key is a secret key,
wherein the signature data is generated by encrypting the data generated by executing the predetermined conversion process to the print data with a public key corresponding to the secret key, and wherein the decryption data is generated by decrypting the signature data with the secret key.

5. The printing device according to claim 3, wherein the key is a public key,
wherein the signature data is generated by encrypting the data generated by executing the predetermined conversion process to the print data with a secret key corresponding to the public key, and
wherein the decryption data is generated by decrypting the signature data with the public key.

6. A signature verifying method used in a printing device which includes a printing unit for printing sheets and communicates with an information processing apparatus via a network, the method comprising:
receiving print data to which signature data is added, from the information processing apparatus;
extracting the signature data from the received print data;
storing a plurality of signature verification data for verifying whether the signature data is genuine in a storage unit, wherein a signature verification program corresponding to one of the plurality of signature verification data is different from a signature verification program corresponding to another of the plurality of signature verification data;
determining whether the extracted signature data correspond to at least one of the signature verification programs;
verifying whether the extracted signature data is genuine by using the signature verification program corresponding to the extracted signature data and the stored signature verification data corresponding to the signature verification program in a case where it is determined that the extracted signature data corresponds to at least one of the signature verification programs; and
controlling the printing unit to execute print process using the print data in a case where the extracted signature data is verified to be genuine.

7. A non-transitory computer readable storage medium encoded with a computer-executable program for executing a signature verifying method used in a printing device which includes a printing unit for printing sheets and communicates with an information processing apparatus via a network, the signature verifying method comprising:
receiving print data to which signature data is added, from the information processing apparatus;
extracting the signature data from the received print data;
storing a plurality of signature verification data for verifying whether the signature data is genuine in a storage unit, wherein a signature verification program corresponding to one of the plurality of signature verification data is different from a signature verification program corresponding to another of the plurality of signature verification data;
determining whether the extracted signature data corresponds to at least one of the signature verification programs;
verifying whether the extracted signature data is genuine by using the signature verification program corresponding to the extracted signature data and the stored signature verification data corresponding to the signature verification program in a case where it is determined that the extracted signature data corresponds to at least one of the signature verification programs; and
controlling the printing unit to execute print process using the print data in a case where the extracted signature data is verified to be genuine.

* * * * *